3,297,733
AMINE DITHIOCARBAMATE TRANSITION METAL COMPOUNDS AND PROCESS OF PREPARATION

Walter A. Kornicker, Zurich, Switzerland, assignor to Monsanto Company, a corporation of Delaware
No Drawing. Filed Jan. 5, 1962, Ser. No. 164,599
Claims priority, application Switzerland, Jan. 11, 1961, 317/61
8 Claims. (Cl. 260—429)

The present invention relates to new amine dithiocarbamate transition metal compounds and to a process of preparing these compounds from transition-metal amides and carbon disulfide. The compounds preparable by the new process have the general formula $$(RR'NCS)_a(RR'N)_b(RO)_c(RS)_dMX_e$$
$$\|$$
$$S$$

In this formula M signify any transition-metal or transition-metal oxide capable to form an amide. Such transition-metals or transition-metal oxides are, for example, Ti, TiO, Zr, ZrO, $Zr_2O_3$, V, VO, Nb, NbO, Mo, MoO, $MoO_2$, W, WO, $WO_2$, Co, Ni, etc. The substituent or substituent-part RR'N represents the radical of a secondary amine, R and R' being aliphatic, araliphatic, aliphaticaryl, cycloaliphatic, aromatic or heterocyclic radicals which may be identical or different. Such secondary amines are, for example, dimethylamine, diethylamine, methyl-ethylamine, dipropylamine, dibutylamine, methylcyclohexylamine, dicyclohexylamine, ethylbenzylamine, dibenzylamine, methylaniline, diphenylamine, 2-methylaminopyridine, etc. The adjacent radicals R and R' also may be interlinked by a further common atom like, e.g. in the heterocyclic secondary amines pyrrolidine, piperidine, morpholine, etc. When the substituent RR'N occurs at least twice, they may be interlinked by their radicals R and R'. In such case, the substituents are derived from secondary diamines such as 1,2-bis(methylamino)-ethane, 1,3-bis-(ethylamino)-propane, 1,2 - bis - (methylamino)-propane, 1,6-bis-(methylamino)-hexane, 1,4-bis-(methylamino)-benzene, 1,2-diphenylguanidine, piperazine, tris-(methylamino)-s-triazine, etc. Alkoxy and mercaptide substituents, if any, may be linked in the same manner with secondary amide substituents. In such case, the substituents are derived from aminoalcohols, aminophenols and aminomercaptans. In the formula above, X signifies a monobasic acid anion or a corresponding part of a polybasic acid anion. In general, X is a halogen atom, preferably a chlorine atom. Preferably R and R' have not more than 18 carbon atoms each, more preferably not more than 8 carbon atoms each.

The dithiocarbamate substituent always present in the novel compounds is formed in the reaction of carbon disulfide with the substituents of secondary amines present in the initial compounds. According to the stoichiometric ratio of the reaction partners or to the reactivity of the transition-metal amides, only one or several or all of the secondary amide groups can be converted to the corresponding dithiocarbamate groups. It has further been found that the transition-metal compounds, besides secondary amide radicals and possibly acid anions, may also contain as substituents alkoxy, aralkoxy, cycloalkoxy, aroxy and mercaptide radicals. Such substituents will not be altered by the action of carbon disulfide under the conditions here employed.

The number of the possible substituents conforms with effective valency $v$ of the transition-metal or transition-metal oxide respectively, in the present compound. Thus, $a+b+c+d+e$ are equal to $v$ and $a$ is a number 1 to $v$, and $b$, $c$, $d$ and $e$ are zero or also a number 1 to $v$, as can be seen from the explanations given before. In the new compounds produced by the process of the invention, $b$ is not zero when M is a transition metal.

The reaction of invention is illustrated below by some equations:

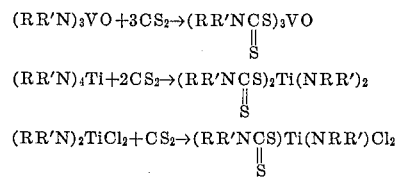

The present invention is carried out by gradual addition of carbon disulfide to a conveniently dissolved amide-containing transition-metal compound.

As solvents are suitable, for example, cyclohexane, benzene etc. Generally, the addition of carbon disulfide occurs easily at room temperature and the reaction is exothermic. One works by excluding moisture and if need be, i.e. with transition-metal compounds which are disposed to oxidation, in an atmosphere of nitrogen. The isolation of the end-products can be achieved by filtration, or if they are soluble in the used solvent, by evaporation of the solvent.

The novel brown to red colored transition-metal compounds in moist atmosphere, only slowly undergo hydrolysis that is due, perhaps, to a particular complex-structure. They can serve as biocides, especially fungicides, pigments for polymers, catalysts for polymerization of olefinic compounds, etc.

The greatest part of the starting compounds necessary for the addition of carbon disulfide are not yet known. Their preparation can be accomplished according to the co-pending patent application No. 93,021, filed March 3, 1961, and now abandoned by reacting alkali salts of secondary amines, of alcohols, phenols and/or mercaptans with transition-metal halides, or oxyhalides respectively in the usual manner. Starting compounds containing mixed substituents may conveniently be prepared also by disproportioning of the thus-obtained transition-metal compounds inter se or with transition metal halides, or oxyhalides respectively. It suffices to such end, to heat the compounds in a solvent for some time, whereupon the treatment by carbon disulfide can be carried out.

Example 1

5.6 g. of tetrakis-(dimethylamido)-titanium (0.025 mole), which possesses a boiling point of 58–60°/0.2 mm., are dissolved under nitrogen in 20 ml. of dry cyclohexane. There is added dropwise within 5 minutes a solution of 3.0 ml. of carbon disulfide (0.05 mole) in 10 ml. of cyclohexane.

The resulting brown suspension is stirred for 2 hours and subsequently decanted. The brown powder is washed with cyclohexane and dried in vacuum. This brown powder is bis-(dimethylamido)-bis-(dimethyldithiocarbamate)-titanium.

Yield: 8.3 g.=88% of the theory for $Ti(NMe_2)_4 \cdot 2CS_2$.
Analysis [$C_{10}H_{24}N_4S_4Ti$ (376.5)]:

| Percent | Calc'd. | Found |
|---|---|---|
| C | 31.9 | 30.8 |
| H | 6.4 | 6.3 |
| N | 14.9 | 14.6 |
| S | 34.0 | 33.7 |
| Ti | 12.7 | 12.5 |

The compound is soluble in chloroform and pyridine, insoluble in ether and hydrocarbons. It is susceptible to oxygen and $H_2S$ is evolved on hydrolysis. The compound is active as a fungicide.

Example 2

2.9 g. of tetrakis-(dimethylamido)-titanium (0.013 mole) and 2.4 g. titanium tetrachloride (0.013 mole) are disproportionated in 50 ml. of dry benzene at 80° C. for 15 minutes. To the brown solution obtained which contains bis(dimethylamido)-dichloro-titanium is added gradually at room temperature 19.5 g. of carbon disulfide (0.26 mole). After left standing overnight bright red crystals are obtained of (dimethylamido)-(dimethyldithiocarbamate)-dichloro-titanium.

Yield: 3.4 g.=46% of the theory for $$Cl_2Ti(NMe_2)_2 \cdot 1CS_2$$

M.P. 180° C.

Analysis [$C_5H_{12}Cl_2N_2S_2Ti$ (283.1)]:

| Percent | Calc'd. | Found |
|---------|---------|-------|
| C       | 21.2    | 20.8  |
| H       | 4.3     | 4.8   |
| N       | 9.9     | 9.7   |
| Cl      | 25.1    | 25.5  |
| S       | 22.6    | 22.1  |
| Ti      | 16.9    | 17.2  |

Example 3

To 28.4 g. of tris-(diethylamido)-vanadium oxide (0.1 mole) in 100 ml. of hexane are added gradually 36 ml. of carbon disulfide (0.6 mole). The reaction is exothermic. The resulting brown suspension is stirred for 2 hours, filtered, washed with hexane and dried in vacuum. The product is tris-(diethyldithiocarbamate)-vanadium oxide.

Yield: 48.6 g.=95% of the theory for $$VO(NEt_2)_3 \cdot 3CS_2$$

brown crystalline product.

Analysis [$C_{15}H_{30}N_3OS_6V$ (511.9)]:

| Percent | Calc'd. | Found |
|---------|---------|-------|
| C       | 35.50   | 35.66 |
| H       | 5.87    | 6.09  |
| O*      | 3.13    | 3.40  |
| N       | 7.90    | 8.40  |
| S       | 37.84   | 36.53 |
| V       | 9.96    | 10.22 |

*Directly determined according to Unterzaucher.

What is claimed is:

1. A process for preparing bis-(dimethylamido)-bis-(dimethyldithiocarbamate)-titanium comprising reacting tetrakis-(dimethylamido)-titanium with carbon disulfide.

2. A process for preparing (dimethylamido)-(dimethyldithiocarbamate)-dichloro-titanium comprising reacting bis-(dimethylamido)-dichloro-titanium with carbon disulfide.

3. A process for preparing tris-(diethyldithiocarbamate)-vanadium oxide, comprising reacting tris-(diethylamido)-vanadium oxide with carbon disulfide.

4. Bis - (dimethylamido) - bis - (dimethyldithiocarbamate)-titanium.

5. (Dimethylamido) - (dimethyldithiocarbamate) - dichloro-titanium.

6. Tris-(diethyldithiocarbamate)-vanadium oxide.

7. A process for preparing dithiocarbamates of the formula $$(RR'N\underset{\underset{S}{\|}}{C}S)_a(RR'N)_bMCl_e$$

wherein R and R' are alkyl radicals having not more than 8 carbon atoms, M is selected from the class consisting of titanium, vanadium and oxides thereof, $a$ is an integer from 1 to $v$ and $b$ and $e$ are integers from 0 to $v-1$, provided $a+b+e$ equals the effective valence $v$ of M, comprising reacting a transition-metal compound of the formula $$(RR'N)_{a+b}MCl_e$$

wherein $a$, $b$, $e$, M, R and R' are as defined herein above, with carbon disulfide.

8. A dithiocarbamate of the formula $$(RR'N\underset{\underset{S}{\|}}{C}S)_a(RR'N)_bMCl_e$$

wherein R and R' are alkyl radicals having not more than 8 carbon atoms, M is selected from the class consisting of titanium, vanadium and oxides thereof, $a$ is an integer from 1 to $v$, and $b$ and $e$ are integers from 0 to $v-1$, provided $a+b+e$ equals the effective valence $v$ of M, and further provided that when M is the metal per se $b$ is an integer from 1 to $v-1$.

References Cited by the Examiner

UNITED STATES PATENTS 2,693,485 11/1954 Gobeil _____ 260—429
2,805,996 9/1957 Deger _____ 260—429.9

OTHER REFERENCES

Delepine, M.: Bull. Soc. Chem., 4 (1908), page 645.

TOBIAS E. LEVOW, *Primary Examiner.*

W. J. VAN BALEN, T. L. IAPALUCCI, A. P. DEMERS,
*Assistant Examiners.*